United States Patent
Kang et al.

(10) Patent No.: US 10,082,698 B2
(45) Date of Patent: Sep. 25, 2018

(54) DISPLAY DEVICE AND METHOD OF MANUFACTURING THE SAME

(71) Applicant: Samsung Display Co., Ltd., Yongin-Si, Gyeonggi-Do (KR)

(72) Inventors: Sungyong Kang, Asan-si, KS (US); Haksun Kim, Seoul (KR); Taegil Kang, Hwaseong-si (KR)

(73) Assignee: SAMSUNG DISPLAY CO., LTD., Gyeonggi-Do (KR)

( * ) Notice: Subject to any disclaimer, the term of this patent is extended or adjusted under 35 U.S.C. 154(b) by 87 days.

(21) Appl. No.: 15/384,952

(22) Filed: Dec. 20, 2016

(65) Prior Publication Data
US 2017/0199429 A1    Jul. 13, 2017

(30) Foreign Application Priority Data
Jan. 13, 2016    (KR) .................. 10-2016-0004321

(51) Int. Cl.
| | |
|---|---|
| G02F 1/1335 | (2006.01) |
| G02F 1/133 | (2006.01) |
| G02F 1/1343 | (2006.01) |
| G02F 1/1333 | (2006.01) |

(52) U.S. Cl.
CPC .... G02F 1/133611 (2013.01); G02F 1/13306 (2013.01); G02F 1/13439 (2013.01); G02F 1/133603 (2013.01); G02F 1/133536 (2013.01); G02F 1/133605 (2013.01); G02F 1/133606 (2013.01); G02F 2001/133302 (2013.01); G02F 2001/133538 (2013.01); G02F 2001/133548 (2013.01)

(58) Field of Classification Search
CPC .................. F21S 8/00; G02F 1/133606; G02F 1/133605; G02F 1/133603
See application file for complete search history.

(56) References Cited

U.S. PATENT DOCUMENTS

| | | | |
|---|---|---|---|
| 8,848,135 B2 * | 9/2014 | Koganezawa | .... G02F 1/133603 348/790 |
| 2004/0027511 A1 * | 2/2004 | Doe | .................. G02F 1/133555 349/63 |
| 2007/0211184 A1 | 9/2007 | Erchak et al. | |
| 2009/0185276 A1 * | 7/2009 | Matsuhira | .............. G02B 1/105 359/601 |
| 2010/0033954 A1 | 2/2010 | Boonekamp et al. | |

(Continued)

FOREIGN PATENT DOCUMENTS

| | | |
|---|---|---|
| KR | 100382066 B1 | 4/2003 |
| KR | 1020050108926 A | 11/2005 |

(Continued)

Primary Examiner — Hoan C Nguyen
(74) Attorney, Agent, or Firm — Cantor Colburn LLP

(57) ABSTRACT

A display device includes a display panel, a reflection plate, and a light emitting diode light source, the display panel including a lower substrate including a lower base substrate, a liquid crystal layer disposed on the lower substrate, and a light source driving electrode disposed on a lower surface of the lower base substrate where the reflection plate is disposed under the display panel, and the light emitting diode light source is disposed on the lower surface of the lower base substrate, connected to the light source driving electrode, and emits a light to the reflection plate.

20 Claims, 11 Drawing Sheets

(56) References Cited

U.S. PATENT DOCUMENTS

2014/0022490 A1\* 1/2014 Baek .................. G02F 1/133603
                                                                                349/62
2017/0003540 A1\* 1/2017 Chen ................... G02F 1/13452

FOREIGN PATENT DOCUMENTS

| KR | 1020080066255 A | 7/2008 |
| KR | 1020110139365 A | 12/2011 |
| KR | 1020130032470 A | 4/2013 |

\* cited by examiner

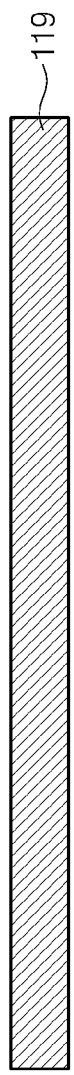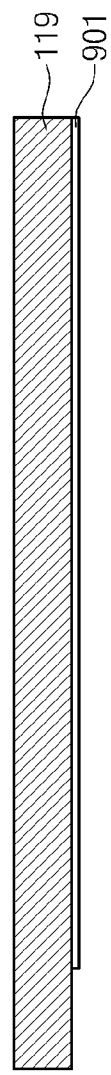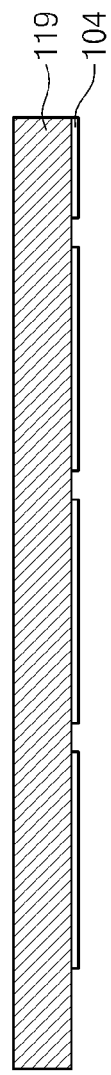

DISPLAY DEVICE AND METHOD OF MANUFACTURING THE SAME

This application claims priority to Korean Patent Application No. 10-2016-0004321, filed on Jan. 13, 2016, and all the benefits accruing therefrom under 35 U.S.C. § 119, the content of which in its entirety is herein incorporated by reference.

BACKGROUND

1. Field

Exemplary embodiments of the invention relate to a display device and a method of manufacturing the display device. More particularly, exemplary embodiments of the invention relate to a display device having improved brightness uniformity and thin thickness and a method of manufacturing the display device.

2. Description of the Related Art

A display device is classified into a liquid crystal display ("LCD"), an organic light emitting diode display ("OLED"), a plasma display panel ("PDP"), and an electrophoretic display, for example, in accordance with the light emitting manner thereof.

The display device generally includes a display panel, various frames supporting and accommodating the display panel, and various optical sheets improving optical characteristics of the display panel. In the display device, the display panel, the frames, and the optical sheets are sequentially stacked. In addition, the display panel includes a display part and a non-display part surrounding the display part, and the frame is disposed to cover the non-display part of the display panel.

SUMMARY

Exemplary embodiments of the invention provide a display device having improved brightness uniformity and thin thickness.

Exemplary embodiments of the invention provide a method of manufacturing the display device.

Exemplary embodiments of the invention provide a display device including a display panel including a lower substrate including a lower base substrate, a liquid crystal layer disposed on the lower substrate, and a light source driving electrode disposed on a lower surface of the lower base substrate, a reflection plate disposed under the display panel, and a light emitting diode ("LED") light source disposed on the lower surface of the lower base substrate, connected to the light source driving electrode, and emitting a light to the reflection plate.

In an exemplary embodiment, the lower substrate further may include an in-cell reflective polarizing plate disposed on the lower base substrate and including a plurality of wire grid patterns.

In an exemplary embodiment, the display device further may include an upper substrate disposed on the liquid crystal layer and an upper polarizing plate disposed on the upper substrate. The in-cell reflective polarizing plate may have a polarization axis that is substantially perpendicular to a polarization axis of the upper polarizing plate.

In an exemplary embodiment, the display device further may include a diffusion plate disposed between the display panel and the reflection plate.

In an exemplary embodiment, the display device may further include a diffusion member disposed on a lower surface of the light source driving electrode.

In an exemplary embodiment, the LED light source may be inserted to a light source hole defined through the diffusion member.

In an exemplary embodiment, the lower substrate further may include a diffusion particle disposed in the lower base substrate, and the lower base substrate may have a refractive index that is different from a refractive index of the diffusion particle.

In an exemplary embodiment, the light source driving electrode may be a semi-transparent electrode or a transparent electrode.

In an exemplary embodiment, the display device further may include a light source line film including a base film and a first light source driving line disposed on the base film. The first light source driving line may connect a pad part disposed at an edge area of an upper surface of the lower base substrate to the light source driving electrode.

In an exemplary embodiment, the display device may further include a printed circuit board ("PCB"), a driver disposed on the PCB, a connection film connecting the PCB to the edge area, and a second light source driving line connecting the pad part to the driver and including a first connector disposed on the connection film.

In an exemplary embodiment, the second light source driving line may further include a second connector, the second connector may be disposed on the lower base substrate, and the second connector may include one end connected to the pad part and the other end connected to the first connector.

In an exemplary embodiment, the second light source driving line may further include a third connector, the third connector may be disposed on the PCB, and the third connector may include one end connected to the driver and the other end connected to the first connector.

In an exemplary embodiment, the driver may include a panel driver controlling the display panel and a light source driver controlling the LED light source. The second light source driving line may be connected to the light source driver In an exemplary embodiment, the light source line film further may include a first light source power line disposed on the base film, and the first light source power line may connect the pad part to the light source driving electrode.

In an exemplary embodiment, the display device further may include a PCB, a voltage supplier disposed on the PCB, a connection film connecting the PCB to the edge area, and a second light source power line connecting the pad part to the voltage supplier and including a connection part disposed in the connection film.

In an exemplary embodiment, a film hole may be defined through the lower base substrate, and the light source line film may be connected to the pad part through the film hole.

An exemplary embodiment of the invention provides a method of manufacturing a display device, including providing a lower base substrate, disposing LED light sources on a lower surface of the lower base substrate, forming a pixel circuit layer on an upper surface of the lower base substrate, and forming a liquid crystal layer on the pixel circuit layer.

In an exemplary embodiment, the method further may include forming a light source driving electrode on the lower surface of the lower base substrate, and the light source driving electrode connects the LED light sources.

In an exemplary embodiment, the forming of the light source driving electrode may include forming a conductive layer on the lower surface of the lower base substrate and patterning the conductive layer to allow the LED light sources to be connected to one after another.

In an exemplary embodiment, the method may further include forming an in-cell reflective polarizing plate on the upper surface of the lower base substrate, disposing an upper substrate on the liquid crystal layer, and disposing an upper polarizing plate on the upper substrate. The in-cell reflective polarizing plate may have a polarization axis that is substantially perpendicular to a polarization axis of the upper polarizing plate.

According to the above, since the light sources are disposed on the lower surface of the lower base substrate to emit the light to the lower direction of the display panel and the light emitted from the light sources is reflected by the reflection plate to travel upward, the traveling distance of the light emitted from the light sources increases.

That is, as the optical distance increases, the traveling distance of the light emitted from the light sources becomes twice the optical distance. Thus, the light is effectively diffused and the brightness uniformity of the display device is improved.

Further, since the pitch, which is defined as the distance between the light sources, is adjusted together with the optical distance, an appropriate surface light source is achieved and the display device becomes slim.

BRIEF DESCRIPTION OF THE DRAWINGS

The above and other advantages of the invention will become readily apparent by reference to the following detailed description when considered in conjunction with the accompanying drawings, in which:

FIGS. 9A to 9F are cross-sectional views showing the manufacturing method of the display device of FIG. 7.

DETAILED DESCRIPTION

Figure 1A:
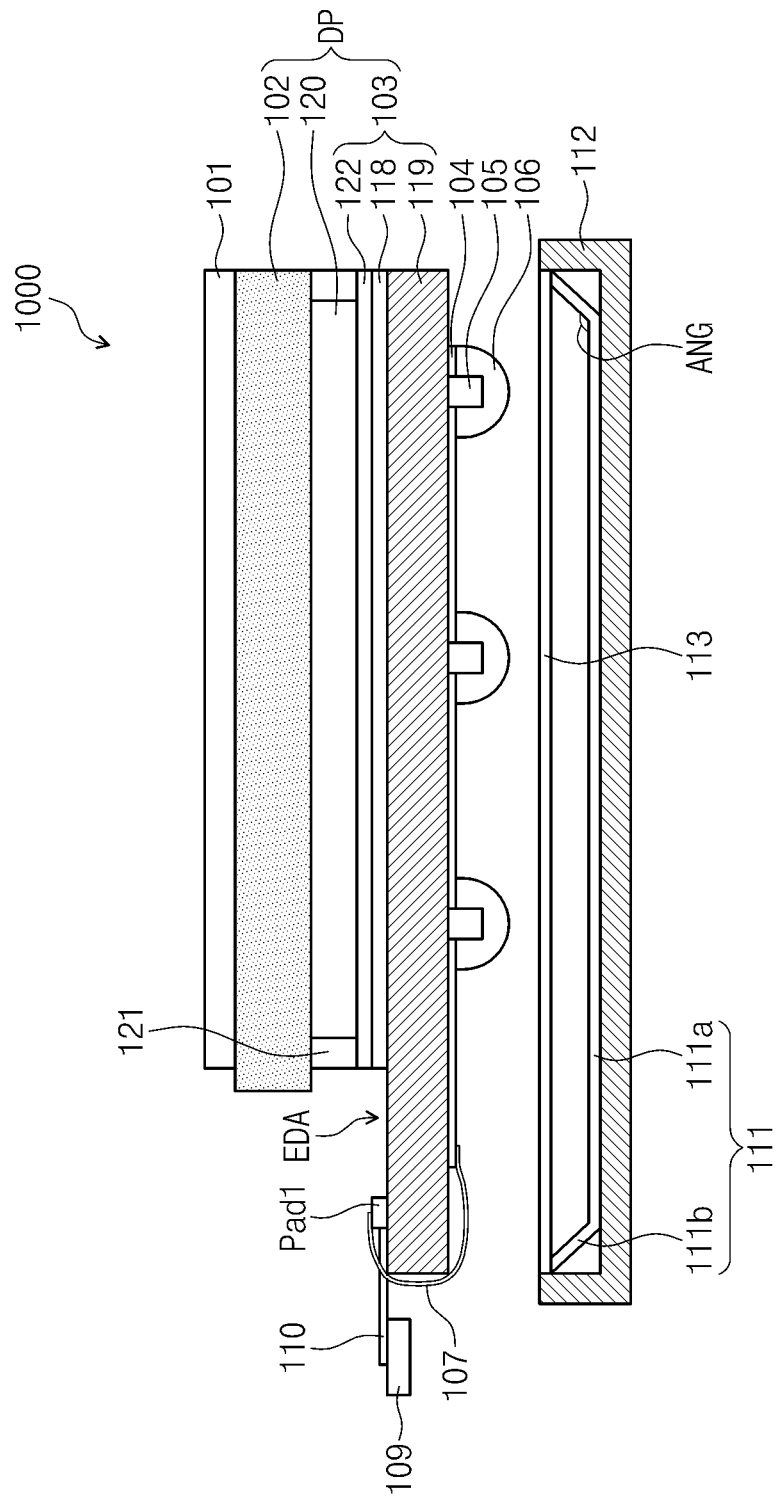
FIG. 1A is a cross-sectional view showing an exemplary embodiment of a display device according to the invention.

The following description with reference to the accompanying drawings is provided to assist in a comprehensive understanding of various embodiments of the invention as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the invention.

Like numerals refer to like elements throughout. In the drawings, the thickness of layers, films, and regions are exaggerated for clarity. It will be understood that, although the terms first, second, etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the invention.

It will be further understood that the terms "includes" and/or "including", when used in this specification, specify the presence of stated features, integers, steps, operations, elements, and/or components, but do not preclude the presence or addition of one or more other features, integers, steps, operations, elements, components, and/or groups thereof. It will be understood that when an element or layer is referred to as being "on", "connected to" or "coupled to" another element or layer, it can be directly on, connected or coupled to the other element or layer or intervening elements or layers may be present. In contrast, when an element is referred to as being "directly on," "directly connected to" or "directly coupled to" another element or layer, there are no intervening elements or layers present. Like numbers refer to like elements throughout. As used herein, the term "and/or" includes any and all combinations of one or more of the associated listed items.

It will be understood that, although the terms "first," "second," "third" etc. may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, "a first element," "component," "region," "layer" or "section" discussed below could be termed a second element, component, region, layer or section without departing from the teachings herein.

Furthermore, relative terms, such as "lower" or "bottom" and "upper" or "top," may be used herein to describe one element's relationship to another element as illustrated in the Figures. It will be understood that relative terms are intended to encompass different orientations of the device in addition to the orientation depicted in the Figures. In an exemplary embodiment, when the device in one of the figures is turned over, elements described as being on the "lower" side of other elements would then be oriented on "upper" sides of the other elements. The exemplary term "lower," can therefore, encompasses both an orientation of "lower" and "upper," depending on the particular orientation of the figure. Similarly, when the device in one of the figures is turned over, elements described as "below" or "beneath" other elements would then be oriented "above" the other elements. The exemplary terms "below" or "beneath" can, therefore, encompass both an orientation of above and below.

"About" or "approximately" as used herein is inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±30%, 20%, 10%, 5% of the stated value.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and the invention, and will not be interpreted in an idealized or overly formal sense unless expressly so defined herein.

Exemplary embodiments are described herein with reference to cross section illustrations that are schematic illustrations of idealized embodiments. As such, variations from the shapes of the illustrations as a result, for example, of manufacturing techniques and/or tolerances, are to be expected. Thus, embodiments described herein should not be construed as limited to the particular shapes of regions as illustrated herein but are to include deviations in shapes that result, for example, from manufacturing. In an exemplary embodiment, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the claims.

Hereinafter, the invention will be explained in detail with reference to the accompanying drawings.

Figure 1B:
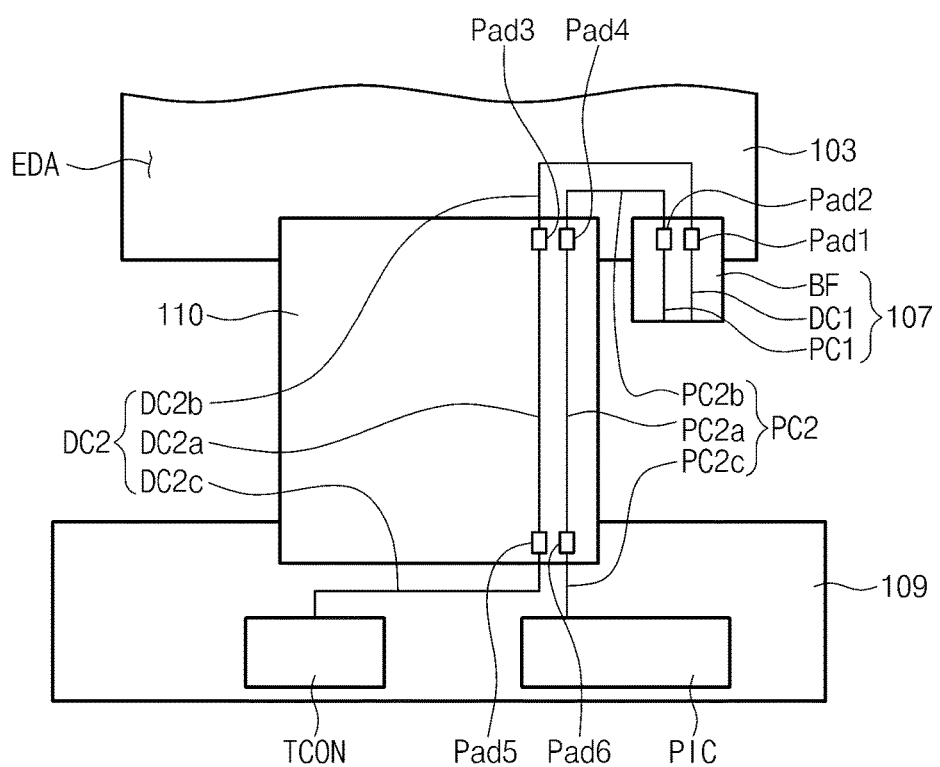
FIG. 1B is a plan view showing an exemplary embodiment of a portion of the display device according to the invention.

FIG. 1A is a cross-sectional view showing a display device 1000 according to an exemplary embodiment of the invention, and FIG. 1B is a plan view showing a portion of the display device according to the invention.

Referring to FIG. 1A, the display device 1000 includes a display panel DP and an upper polarizing plate 101.

The display panel DP includes a lower substrate 103, a liquid crystal layer 120, and an upper substrate 102.

The lower substrate 103 includes a lower base substrate 119, a pixel layer 122, and an in-cell reflective polarizing plate 118.

In an exemplary embodiment, the lower base substrate 119 has a substantially plate shape. In an exemplary embodiment, the lower base substrate 119 may include a plastic material having superior heat-resistance and durability, such as polyimide ("PI"), polyethylene terephthalate ("PET"), polyethylene naphtalate ("PEN"), polycarbonate ("PC"), polyarylate ("PAR"), polyetherimide (PEI), polyethersulphone ("PES"), fiber reinforced plastics, etc. However, the material for the lower base substrate 119 should not be limited thereto or thereby, and the lower base substrate 119 may include various other materials, such as metal foil, thin glass, etc.

The in-cell reflective polarizing plate 118 has a first polarization axis (not shown) and is disposed on the lower base substrate 119. The in-cell reflective polarizing plate 118 receives a light and polarizes the light in a direction substantially parallel to the first polarization axis.

The pixel layer 122 is disposed on the in-cell reflective polarizing plate 118.

The pixel layer 122 includes a thin film transistor ("TFT") TR (shown in FIG. 2) that selectively outputs a data voltage in response to a gate voltage.

Detailed descriptions on the in-cell reflective polarizing plate 118 and the pixel layer 122 will be described later with reference to FIG. 2.

The liquid crystal layer 120 is disposed on the lower substrate 103.

The liquid crystal layer 120 includes liquid crystal molecules (not shown). The liquid crystal molecules are controlled by an electric field generated by the data voltage.

A sealant 121 may be disposed at an edge of the liquid crystal layer 120 to prevent the liquid crystal molecules from leaking.

The upper substrate 102 is disposed on the liquid crystal layer 120.

The upper substrate 102 may include a color filter (not shown) that realizes a predetermined color using a light provided from a light source.

The upper polarizing plate 101 is disposed on the upper substrate 102.

The upper polarizing plate 101 has a second polarization axis (not shown). The upper polarizing plate 101 receives a light and polarizes the light in a direction substantially parallel to the second polarization axis.

In the illustrated exemplary embodiment of the invention, the display device 1000 further includes the light source 105, a light source driving electrode 104, a diffusion plate 113, a reflection plate 111, and a bottom chassis 112.

The light source 105 is disposed (e.g., mounted) on a lower surface of the lower base substrate 119.

The light source 105 is provided in a plural number as shown in FIG. 1A. The light sources 105 emit the light to allow the display panel DP to display an image. The light sources 105 emit the light toward the reflection plate 111.

In the illustrated exemplary embodiment, the light source 105 may be, but not limited to, a light emitting diode ("LED") light source, for example. In an exemplary embodiment, the LED light source may generate a white light, for example. In an exemplary embodiment, the LED light source may generate a blue light, a red light, and a green light, for example.

A cover lens 106 has a predetermined refractive index and is provided in a plural number. Each of the cover lenses 106 has a dome shape. Each of the cover lenses 106 covers a corresponding light source of the light sources 105. The cover lenses 106 have the same structure and functions, and thus one cover lens 106 will be described in detail.

The cover lens 106 refracts the light emitted from the light sources 105 to uniformly distribute the light.

The light source driving electrode 104 is disposed on the lower surface of the lower base substrate 119.

The light source driving electrode 104 connects the light sources 105. The light source driving electrode 104 provides a driving signal and a source voltage to drive the light source 105.

The diffusion plate 113 is disposed under the light sources 105. The diffusion plate 113 has a substantially plate shape and diffuses the light emitted from the light sources 105 to a lower direction thereof.

The reflection plate 111 is disposed under the diffusion plate 113. The reflection plate 111 includes a center portion 111a and an edge portion 111b defined therein. The center portion 111a has a substantially flat plate shape. The edge portion 111b is inclined and extends from the center portion 111a. More particularly, the edge portion 111b defines a predetermined angle ANG with respect to the center portion 111a. The predetermined angle ANG may be an obtuse angle.

Since the edge portion 111b and the center portion 111a define the predetermined angle ANG to reflect the light traveling to the edge portion 111b to the center portion 111a, the light is prevented from leaking through a side surface of the display panel DP.

The bottom chassis 112 includes an accommodating space defined therein. As an exemplary embodiment of the invention, the diffusion plate 113 and the reflection plate 111 are accommodated in the accommodating space of the bottom chassis 112.

The bottom chassis 112 accommodates the diffusion plate 113, the reflection plate 111, and the display panel DP in the accommodating space thereof to absorb the external impact, and thus components accommodated in the bottom chassis 112 are protected from the external impact.

Referring to FIGS. 1A and 1B, the display device 1000 further includes a light source line film 107, a first pad Pad1, a second pad Pad2, a third pad Pad3, a fourth pad Pad4, a fifth pad Pad5, a sixth pad Pad6, a connection film 110, a printed circuit board ("PCB") 109, a second light source driving line DC2, and a second light source power line PC2.

The light source line film 107 includes a base film BF, a first light source driving line DC1, and a first light source power line PC1.

One end of the base film BF is attached to the lower surface of the lower base substrate 119, and the other end of the base film BF is attached to an upper surface of the lower base substrate 119. In detail, the other end of the base film BF is attached to an edge area EDA in the upper surface of the lower base substrate 119.

The first pad Pad1 and the second pad Pad2 are disposed in the edge area EDA.

The first light source driving line DC1 is disposed on the base film BF.

The first light source driving line DC1 electrically connects the first pad Pad1 to the light source driving electrode 104.

The first light source power line PC1 is disposed on the base film BF.

Although not shown in FIG. 1B, a light source line cover film (not shown) may be disposed on the base film BF to cover the first light source power line PC1 and the first light source driving line DC1. The first light source power line PC1 electrically connects the second pad Pad2 to the light source driving electrode 104.

Although not shown in FIG. 1B, a light source controller (not shown) may be disposed on the base film BF. The light source controller may be electrically connected to the first light source driving line DC1 and the first light source power line PC1. The light source controller may receive a light source control signal, which will be described later, from the first light source driving line DC1 and the source voltage driving the light sources 105 from the first light source power line PC1 and apply the light source control signal and the source voltage to the light sources 105 through the light source driving electrode 104.

The third pad Pad3 and the fourth pad Pad4 are disposed in the edge area EDA.

The fifth pad Pad5 and the sixth pad Pad6 are disposed on the PCB 109.

The connection film 110 connects the PCB 109 and the edge area EDA. One end of the connection film 110 is attached to the edge area EDA, and the other end of the connection film 110 is attached to the PCB 109. In the illustrated exemplary embodiment, a semiconductor chip may be disposed (e.g., mounted) on the connection film 110 using a chip on film ("COF") method, for example. However, the method of disposing (e.g., mounting) the semiconductor chip on the connection film 110 should not be limited thereto or thereby, and the semiconductor chip may be disposed (e.g., mounted) on the connection film 110 using various other methods.

A driver TCON and a power supplier PIC are disposed on the PCB 109.

The second light source driving line DC2 connects the first pad Pad1 to the driver TCON.

The second light source driving line DC2 includes a first driving connector DC2a, a second driving connector DC2b, and a third driving connector DC2c.

The first driving connector DC2a is disposed on the connection film 110.

Although not shown in FIG. 1B, a connection cover film (not shown) may be disposed on the connection film 110 to cover the first driving connector DC2a. One end of the first driving connector DC2a is connected the third pad Pad3, and the other end of the first driving connector DC2a is connected to the fifth pad Pad5.

The second driving connector DC2b is disposed in the edge area EDA. One end of the second driving connector DC2b is connected to the first pad Pad1, and the other end of the second driving connector DC2b is connected to the third pad Pad3. That is, the other end of the second driving connector DC2b is electrically connected to the first driving connector DC2a.

The third driving connector DC2c is disposed on the PCB 109. One end of the third driving connector DC2c is connected to the driver TCON, and the other end of the third driving connector DC2c is connected to the fifth pad Pad5. That is, the other end of the third driving connector DC2c is electrically connected to the first driving connector DC2a.

The second light source power line PC2 connects the second pad Pad2 to the power supplier PIC.

The second light source power line PC2 includes a first power connector PC2a, a second power connector PC2b, and a third power connector PC2c.

The first power connector PC2a is disposed on the connection film 110.

One end of the first power connector PC2a is connected to the fourth pad Pad4, and the other end of the first power connector PC2a is connected to the sixth pad Pad6.

The second power connector PC2b is disposed in the edge area EDA.

One end of the second power connector PC2b is connected to the second pad Pad2, and the other end of the second power connector PC2b is connected to the fourth pad Pad4. That is, the other end of the second power connector PC2b is electrically connected to the first power connector PC2a.

The third power connector PC2c is disposed on the PCB 109.

One end of the third power connector PC2c is connected to the power supplier PIC, and the other end of the third power connector PC2c is connected to the sixth pad Pad6. That is, the other end of the third power connector PC2c is electrically connected to the first power connector PC2a.

The driver TCON includes a panel driver (not shown) controlling the display panel DP and a light source driver (not shown) controlling the light sources. The panel driver applies a panel control signal controlling the display panel DP to the connection film 110. The panel control signal may be a signal controlling a driver, such as a gate control signal or a data control signal.

In addition, the light source driver may output the light source control signal through the first light source driving line DC1 and the second light source driving line DC2 to control the light sources 105.

The light source driver is disposed (e.g., mounted) on the PCB together with the panel driver, and the light source control signal is output through the connection film together with the panel control signal. In the exemplary embodiment, an additional PCB or an additional connection film for the light source diver is not desired.

The power supplier PIC generates a source voltage to drive the display panel DP. Further, the power supplier PIC is connected to the first light source power line PC1 and the second light source power line PC2 and generates the source voltage to drive the light sources 105.

Consequently, since the light sources 105 are disposed (e.g., mounted) on the lower surface of the lower base substrate 119, the number of components desired to realize the display device is reduced, and thus the manufacturing cost may be reduced.

Figure 2:
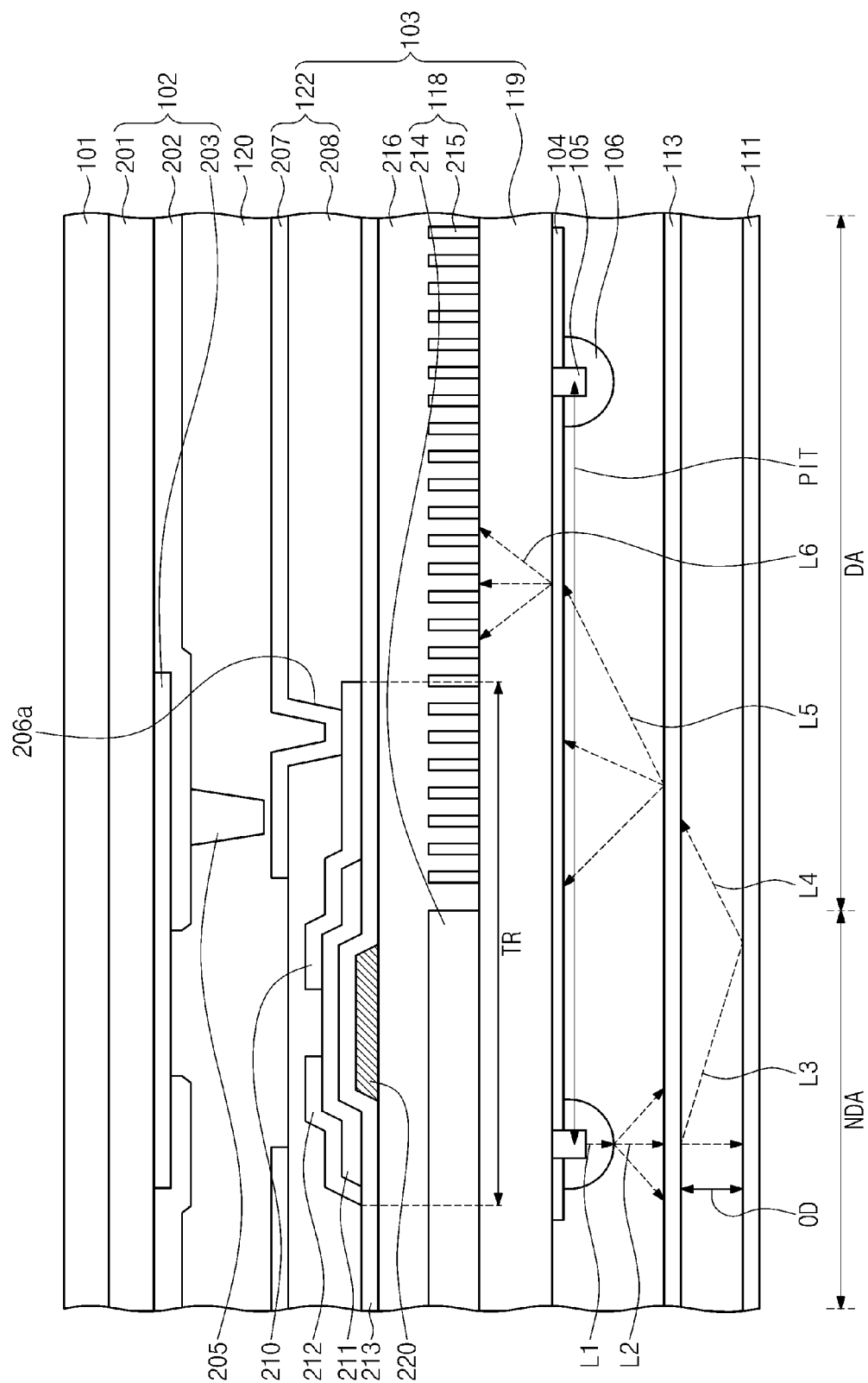
FIG. 2 is a cross-sectional view showing an exemplary embodiment of the display device according to the invention.

FIG. 2 is a cross-sectional view showing the display device according to an exemplary embodiment of the invention.

Referring to FIG. 2, a first light L1 emitted from the light source 105 is refracted by the cover lens 106. Hereinafter, the first light L1 refracted by the cover lens 106 is referred to as a second light L2.

The second light L2 is diffused by the diffusion plate 113. The second light L2 diffused by the diffusion plate 113 is referred to as a third light L3.

The third light L3 is reflected upward by the reflection plate 111 after passing through the diffusion plate 113.

The third light reflected by the reflection plate 111 is referred to as a fourth light L4.

The fourth light L4 travels upward and is diffused again by the diffusion plate 113.

The fourth light L4 diffused again by the diffusion plate 113 is referred to as a fifth light L5.

The fifth light L5 may transmit the light source driving electrode 104.

In an exemplary embodiment, the light source driving electrode 104 may be a transparent electrode or a semi-transparent electrode. Then, the fifth light L5 may transmit the light source driving electrode 104 without decreasing a brightness thereof.

The fifth light L5 travels in the lower base substrate 119 while being diffused. The fifth light L5 traveling in the lower base substrate 119 is referred to as a sixth light L6.

The sixth light L6 travels upward through the lower base substrate 119. The sixth light L6 moves upward and is polarized by the in-cell reflective polarizing plate 118.

More particularly, the in-cell reflective polarizing plate 118 polarizes the sixth light L6 in a direction substantially parallel to the first polarization axis.

In the illustrated exemplary embodiment, the display panel DP includes a display area DA and a non-display area NDA which are defined therein.

The in-cell reflective polarizing plate 118 further includes a plurality of wire grid patterns 215 disposed on the lower base substrate 119 corresponding to the display area DA and a reflective pattern 214 disposed on the lower base substrate 119 corresponding to the non-display area NDA. In an exemplary embodiment, the wire grid patterns 215 and the reflective pattern 214 may include metals, such as aluminum, copper, etc.

A component of the sixth light L6 substantially parallel to a direction in which the wire grid patterns 215 extend is reflected by the wire grid patterns 215.

A component of the sixth light L6 substantially perpendicular to the extending direction of the wire grid patterns 215 is recognized as an effective refractive medium and transmits the wire grid patterns 215. That is, the component of the sixth light L6 substantially parallel to the first polarization axis transmits the in-cell reflective polarizing plate 118.

Thus, the sixth light L6 traveling to a position adjacent to the reflective pattern 214 is reflected downward by the reflective pattern 214. The sixth light L6 reflected downward travels upward again according to the path of the light (i.e., a process in which the first light L1 is changed to the sixth light L6) described above and is polarized by the in-cell reflective polarizing plate 118. Consequently, the utilization efficiency of the light is improved by the reflective pattern 214.

As described above, since the light sources 105 emit the light to a lower direction of the display panel DP and the light is reflected upward by the reflective plate 111, a traveling distance of the light emitted from the light source 105 is increased.

That is, as shown in FIG. 2, as an optical distance OD increases, the traveling distance of the light emitted from the light sources 105 becomes twice the optical distance OD. Thus, the light is effectively diffused and a brightness uniformity of the display device is improved.

Further, when a pitch PIT, which is defined as a distance between the light sources 105, is adjusted together with the optical distance OD, an appropriate surface light source is achieved and the display device becomes slim.

Hereinafter, detailed descriptions of the components disposed above the in-cell reflective polarizing plate 118 will be de described.

Referring to FIG. 2, a base insulating layer 216 is disposed on an upper surface of the in-cell reflective polarizing plate 118. The base insulating layer 216 covers the reflective pattern 214 and the wire grid patterns 215.

The base insulating layer 216 includes an insulating material that electrically insulates the reflective pattern 214 and the wire grid patterns 215 from the pixel layer 122.

The pixel layer 122 includes the TFT TR, an inter-insulating layer 208, and a pixel electrode 207. The TFT TR includes a gate electrode 220, a source electrode 212, and a drain electrode 210.

The gate electrode 220 is disposed on the base insulating layer 216. The gate electrode 220 is covered by the gate insulting layer 213. A semiconductor layer 211 is disposed on the gate insulating layer 213 corresponding to the gate electrode 220. The source electrode 212 and the drain electrode 210 are disposed on the semiconductor layer 211 and spaced apart from each other at a predetermined interval.

The inter-insulating layer 208 is disposed on the gate insulating layer 213 and covers the TFT TR. The pixel electrode 207 is disposed on the inter-insulating layer 208.

A contact hole 206a is defined through the inter-insulating layer 208 to expose the drain electrode 210 of the TFT TR. The pixel electrode 207 is electrically connected to the drain electrode 210 through the contact hole 206a.

The upper substrate 102 includes an upper base substrate 201, a color filter layer 202, and a black matrix 203. The upper base substrate 201 may have a substantially plate shape. In an exemplary embodiment, the upper base substrate 201 may include a plastic material having superior heat-resistance and durability, such as PI, PET, PEN, PC, PAR, PEI, PES, fiber reinforced plastics, etc. However, the material for the upper base substrate 201 should not be limited thereto or thereby, and the upper base substrate 201 may include various other materials, such as metal foil and thin glass, etc.

The upper base substrate 201 is disposed to face the lower base substrate 119.

The black matrix 203 is disposed on the upper base substrate 201 corresponding to the non-display area NDA. In an exemplary embodiment, the color filter layer 202 includes a red color pixel, a green color pixel, and a blue color pixel, for example, and each of the color pixels corresponds to the display area DA and overlaps the black matrix 203.

The liquid crystal layer 120 is interposed between the upper substrate 102 and the lower substrate 103.

The display panel DP further includes a spacer 205 disposed between the upper substrate 102 and the lower substrate 103 to allow the upper substrate 102 and the lower substrate 103 to be spaced apart from each other, and thus a space where the liquid crystal layer 120 is disposed is defined between the upper substrate 102 and the lower substrate 103.

The upper polarizing plate 101 is disposed on the display panel DP.

The upper polarizing plate 101 has a sheet shape or a film shape, and the upper polarizing plate 101 is attached onto the display panel DP.

The second polarization axis of the upper polarizing plate 101 is substantially perpendicular to the first polarization axis of the in-cell reflective polarizing plate 118.

Figure 3:
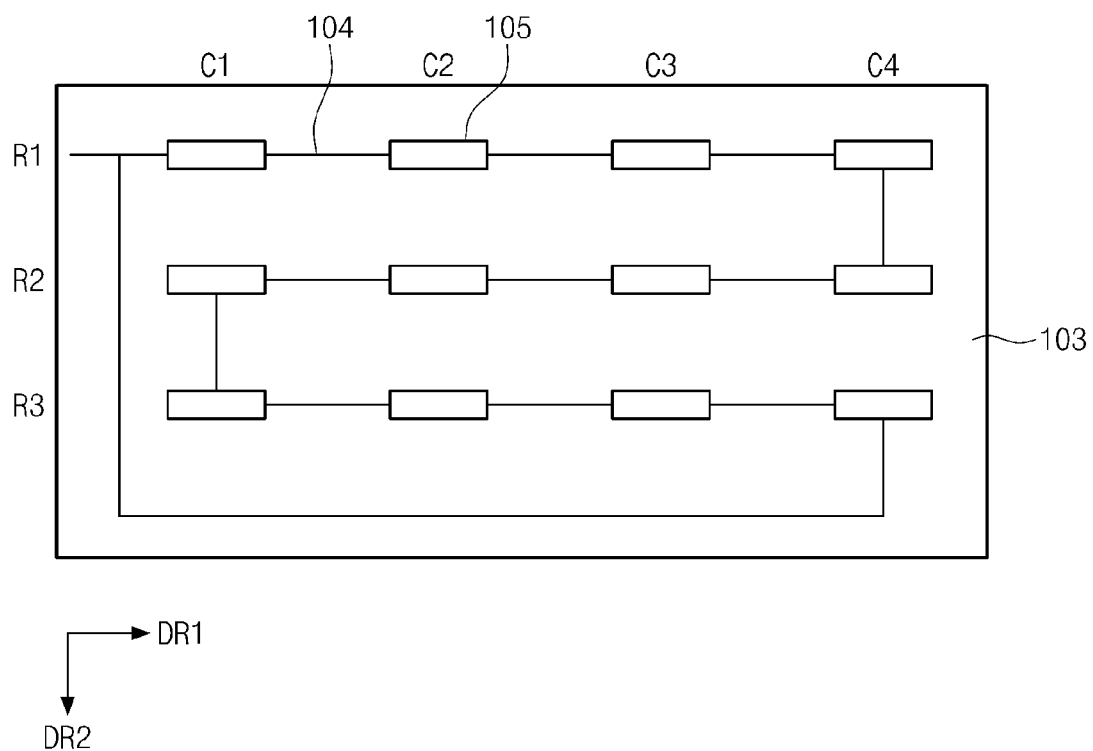
FIG. 3 is a rear view showing an exemplary embodiment of a lower base substrate according to the invention.

FIG. 3 is a rear view showing the lower base substrate according to an exemplary embodiment of the invention.

Referring to FIG. 3, the light sources 105 are spaced apart from each other on the lower surface of the lower base substrate 119.

FIG. 3 shows the light sources 105 arranged in a matrix configuration of three rows R1 to R3 by four columns C1 to C4 which are substantially parallel to a first direction DR1 and a second direction DR2 substantially perpendicular to the first direction DR1, respectively.

In FIG. 3, the light sources 105 are disposed in the matrix configuration of three rows by four columns, however, the light sources 105 may be disposed (e.g., mounted) on the lower base substrate 119 in various other ways.

Referring to FIG. 3, the light sources 105 in a first row R1 are sequentially connected to one after another in the first direction DR1 through the light source driving electrode 104. A light source disposed at the first row R1 and a fourth column C4 is connected to a light source disposed at a second row R2 and the fourth column C4 in the second direction DR2 which is substantially perpendicular to the first direction DR1 through the light source driving electrode 104.

The light sources 105 in the second row R2 are sequentially connected to one after another in the first direction DR1 through the light source driving electrode 104. A light source disposed at the second row R2 and a first column C1 is connected to a light source disposed at a third row R3 and the first column C1 in the second direction DR2 through the light source driving electrode 104.

The light sources 105 in the third row R3 are sequentially connected to one after another in the first direction DR1 through the light source driving electrode 104.

Thus, the light sources 105 shown in FIG. 3 are connected to one another in serial through the light source driving electrode 104.

A light source disposed at the first row R1 and the first column C1 is connected to a light source disposed at the third row R3 and the fourth column C4 through the light source driving electrode 104, and the light source driving electrode 104 connecting the light source disposed at the first row R1 and the first column C1 and the light source disposed at the third row R3 and the fourth column C4 is connected to the light source controller.

That is, referring to FIGS. 1B and 3, the light source driving electrode 104 connecting the light source disposed at the first row R1 and the first column C1 and the light source disposed at the third row R3 and the fourth column C4 receives the source voltage driving the light sources 105 from the first light source power line PC1.

Figure 4:
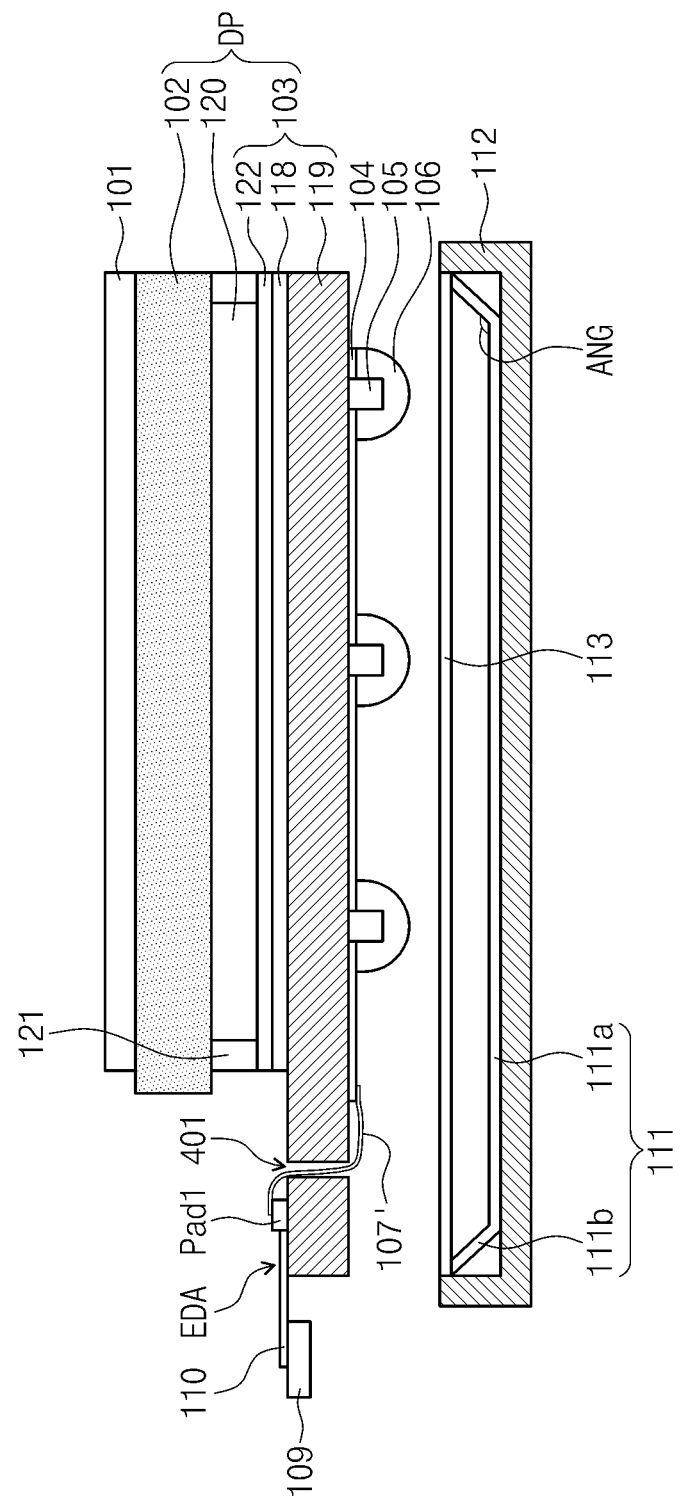
FIG. 4 is a cross-sectional view showing another exemplary embodiment of a display device according to the invention.

FIG. 4 is a cross-sectional view showing a display device according to another exemplary embodiment of the invention.

Referring to FIG. 4, a film hole 401 is defined through an edge of the lower base substrate 119. A light source line film 107' connects the lower surface of the lower base substrate 119 and the edge area EDA through the film hole 401.

The light source line film 107' is inserted into the film hole 401 to connect the lower surface of the lower base substrate 119 and the edge area EDA, and thus the display device becomes slim.

Detailed descriptions of the same elements as those described with reference to FIG. 1 will be omitted.

Figure 5:
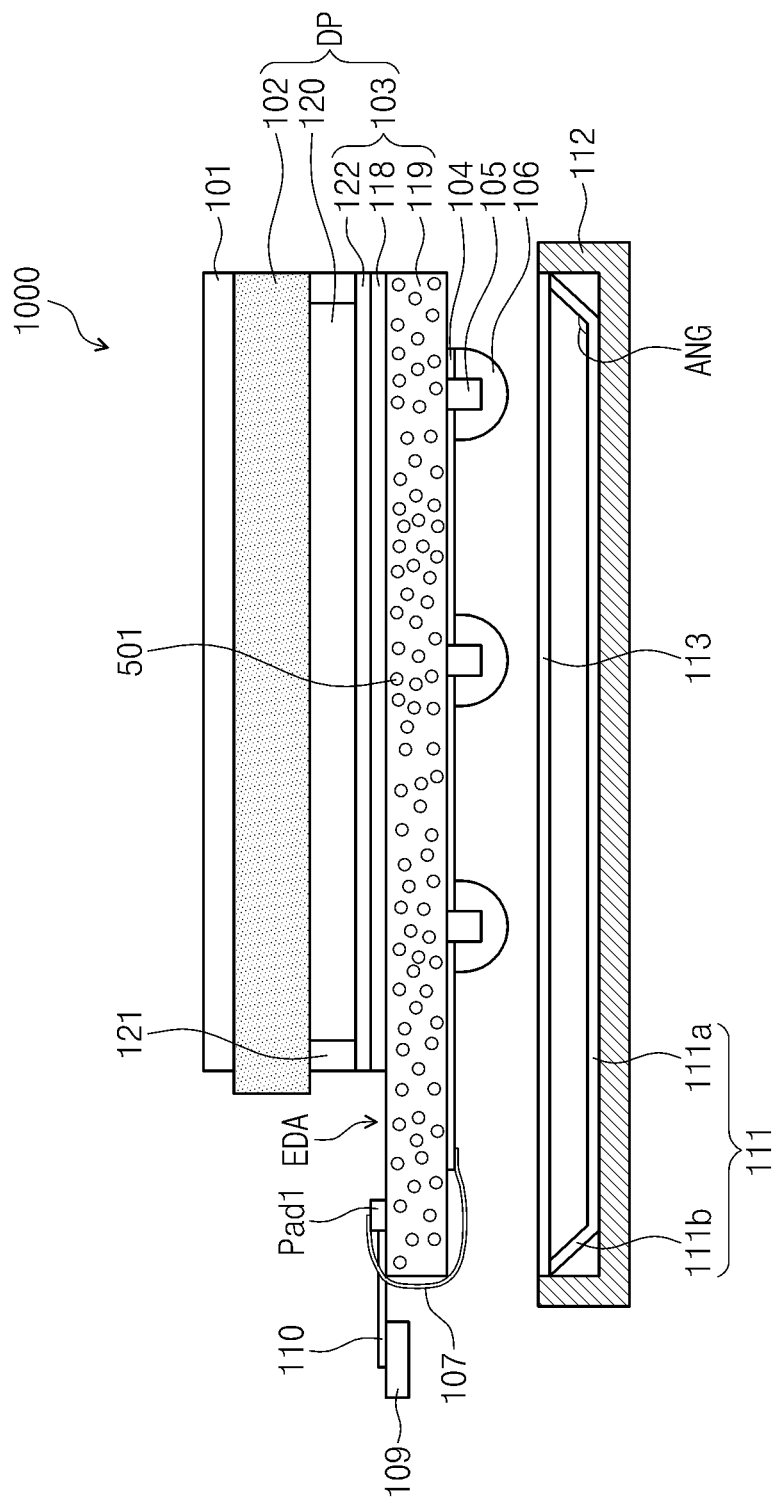
FIG. 5 is a cross-sectional view showing another exemplary embodiment of a display device according to the invention.

FIG. 5 is a cross-sectional view showing a display device according to another exemplary embodiment of the invention.

Referring to FIG. 5, the lower substrate 103 further includes a diffusion particle 501. The diffusion particle 501 is disposed in the lower base substrate 119.

The diffusion particle 501 scatters or reflects a light.

The lower base substrate 119 has a refractive index different from that of the diffusion particle 501. In the illustrated exemplary embodiment, the refractive index of the lower base substrate 119 may be greater than that of the diffusion particle 501.

The diffusion particle 501 may be added to the lower base substrate 119 during a manufacturing process of the lower base substrate 119. In an exemplary embodiment, the diffusion particle 501 may include polymethylmethacrylate ("PMMA") and have a bead shape, for example. However, the material for the diffusion particle 501 or the shape of the diffusion particle 501 should not be limited thereto or thereby.

Since the diffusion particle 501 is disposed in the lower base substrate 119, the light exiting through the lower base substrate 119 is more widely and evenly diffused, and a brightness uniformity of the image displayed in the display panel DP is improved.

Detailed descriptions of the same elements as those described with reference to FIG. 1 will be omitted.

Figure 6:
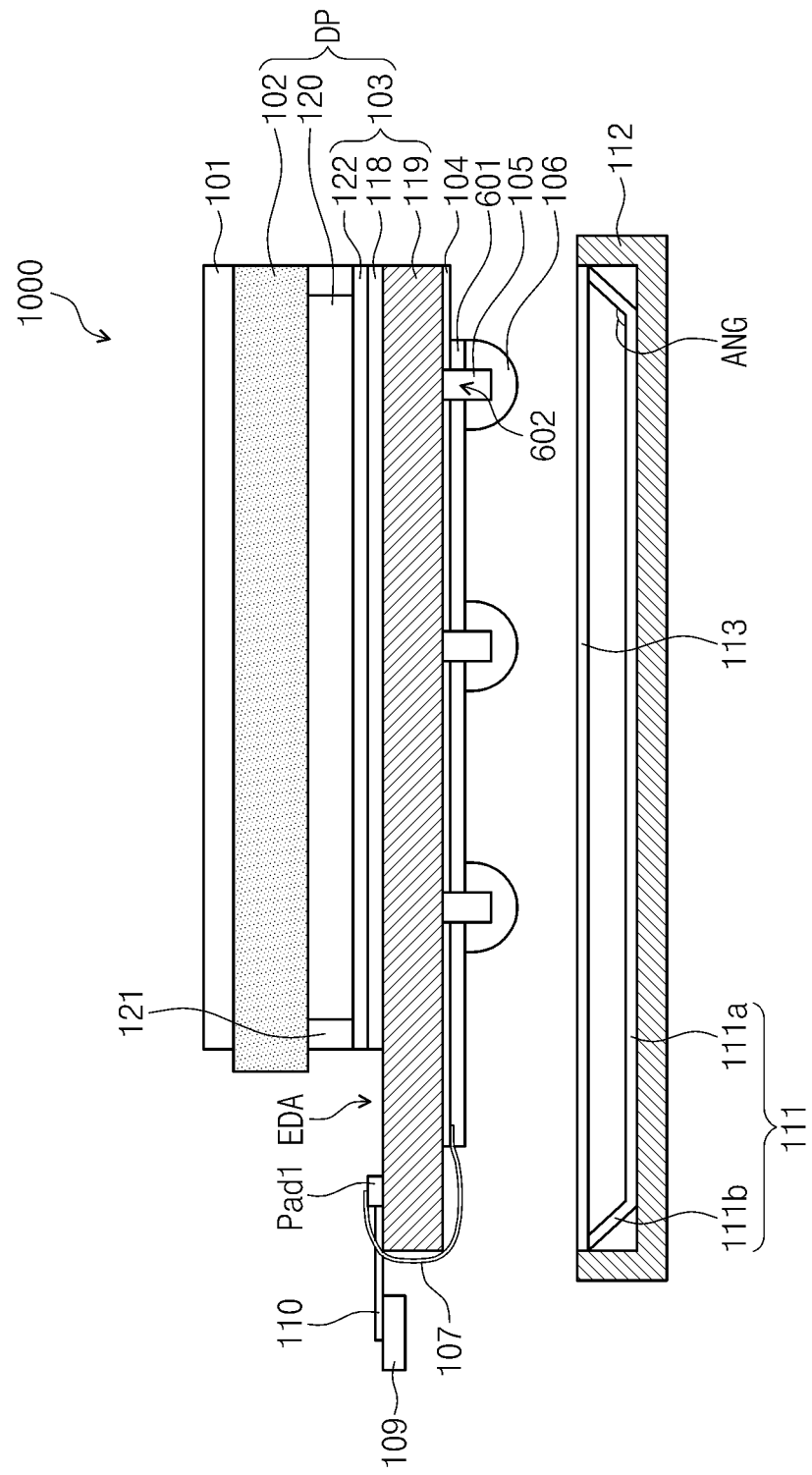
FIG. 6 is a cross-sectional view showing another exemplary embodiment of a display device according to the invention.

FIG. 6 is a cross-sectional view showing a display device 1000' according to another exemplary embodiment of the invention.

Referring to FIG. 6, the display device 1000' further includes a diffusion member 601.

The diffusion member 601 is disposed on a lower surface of the light source driving electrode 104.

Since the diffusion member 601 is disposed on the lower surface of the light source driving electrode 104, a light source hole 602 is defined through the lower surface of the lower base substrate 119.

The light sources 105 are inserted into the light source holes 602, respectively.

In the illustrated exemplary embodiment, the diffusion member 601 includes the diffusion particle scattering and reflecting a light.

Since the diffusion member 601 is disposed on the lower surface of the light source driving electrode 104, the light exiting to the display panel DP is more widely and evenly diffused, and a brightness uniformity of the image displayed in the display panel DP is improved.

Figure 7:
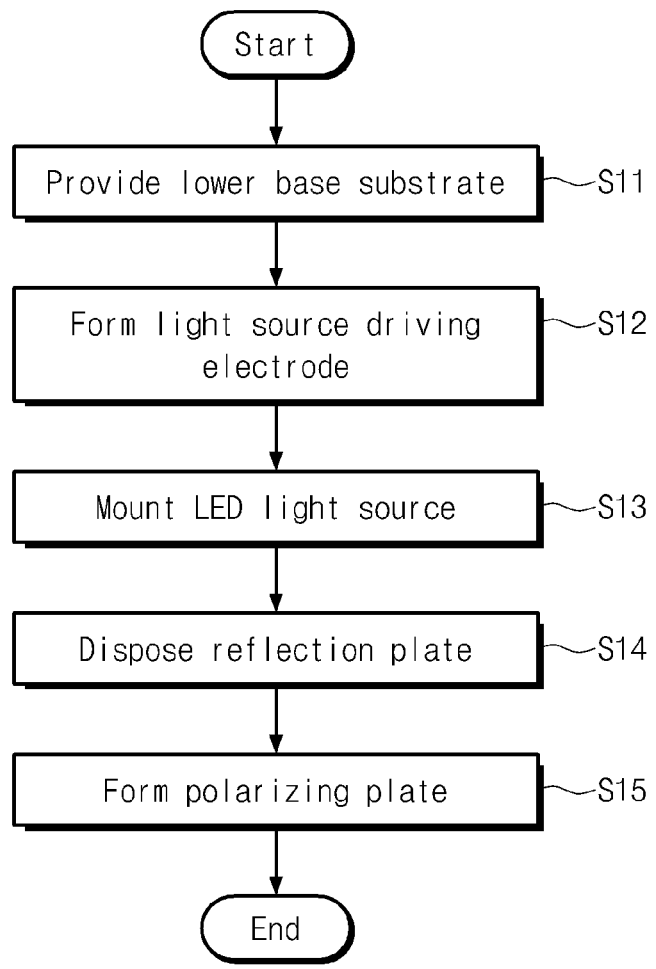
FIG. 7 is a flowchart showing an exemplary embodiment of a method of manufacturing a display device according to the invention.
Figure 8:
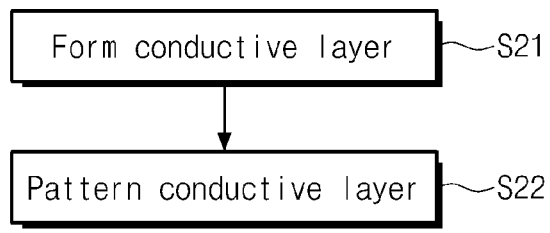
FIG. 8 is a flowchart showing a process of forming a light source driving electrode of FIG. 7.

FIG. 7 is a flowchart showing a manufacturing method of a display device according to the invention, FIG. 8 is a flowchart showing a process of forming a light source driving electrode of FIG. 7, and FIGS. 9A to 9F are cross-sectional views showing the manufacturing method of the display device of FIG. 7.

Referring to FIGS. 7 and 9A, in order to manufacture the display device according to the illustrated exemplary embodiment, a lower base substrate 119 is provided (operation S11). Then, a light source driving electrode 104 is disposed on a lower surface of the lower base substrate 119 (operation S12).

Figure 9D:
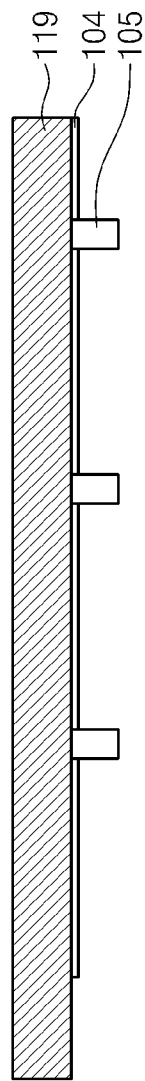

Referring to FIGS. 8, 9B, and 9C, a conductive layer 901 is disposed on the lower surface of the lower base substrate 119 to form the light source driving electrode 104 (operation S21). The conductive layer 901 may include a metal material having a superior electrical conductivity. Then, the conductive layer 901 is patterned to form the light source driving electrode 104 (operation S22). As an exemplary embodiment, the light source driving electrode 104 is provided by forming an indium tin oxide ("ITO") layer on the lower surface of the lower base substrate 119 and performing a photolithography process, for example. Referring to FIGS. 7 and 9D, after the light source driving electrode 104 is provided, a light source 105 is disposed (e.g., mounted) on the lower surface of the lower base substrate 119 (operation S13). The light source 105 is provided in a plural number, and the light sources 105 are disposed (e.g., mounted) on the lower surface of the lower base substrate 119 to be electrically connected to each other by the light source driving electrode 104.

Figure 9E:
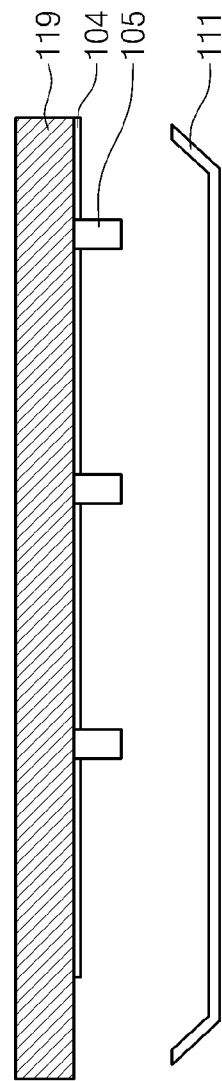

Referring to FIGS. 7 and 9E, a reflection plate 111 is disposed under the light sources 105 (operation S14). Since the reflection plate 111 is described with reference to FIG. 1, detailed descriptions of the reflection plate 111 will be omitted.

Figure 9F:
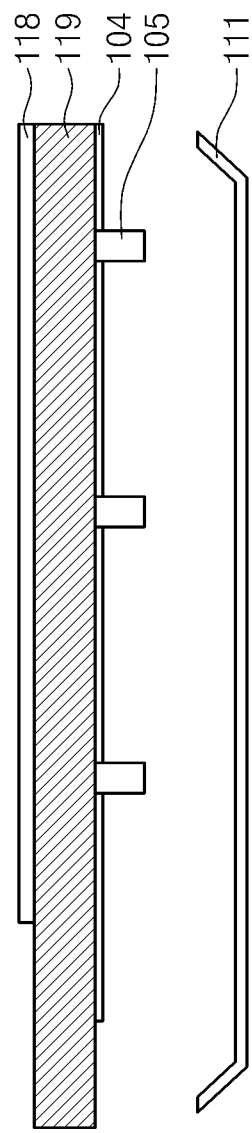

Then, referring to FIGS. 7 and 9F, an in-cell reflective polarizing plate 118 is disposed on the lower base substrate 119 (operation S15). Since the in-cell reflective polarizing plate 118 is described in detail with reference to FIG. 2, detailed descriptions of the in-cell reflective polarizing plate 118 will be omitted.

The operation S14 and the operation S15 are sequentially shown in FIG. 7, however, the operation S14 and the operation S15 may be performed regardless of the manufacturing order of the display device.

Although the exemplary embodiments of the invention have been described, it is understood that the invention should not be limited to these exemplary embodiments but various changes and modifications can be made by one ordinary skilled in the art within the spirit and scope of the invention as hereinafter claimed.

What is claimed is:

1. A display device comprising:
   a display panel comprising a lower substrate comprising a lower base substrate, a liquid crystal layer disposed on the lower substrate, and a light source driving electrode disposed on a lower surface of the lower base substrate;
   a reflection plate disposed under the display panel; and
   a light emitting diode light source which is disposed on the lower surface of the lower base substrate, connected to the light source driving electrode, and emits a light to the reflection plate.

2. The display device of claim 1, wherein the lower substrate further comprises an in-cell reflective polarizing plate disposed on the lower base substrate and comprising a plurality of wire grid patterns.

3. The display device of claim 2, further comprising:
   an upper substrate disposed on the liquid crystal layer; and
   an upper polarizing plate disposed on the upper substrate, wherein the in-cell reflective polarizing plate has a polarization axis which is substantially perpendicular to a polarization axis of the upper polarizing plate.

4. The display device of claim 1, further comprising a diffusion plate disposed between the display panel and the reflection plate.

5. The display device of claim 4, further comprising a diffusion member disposed on a lower surface of the light source driving electrode.

6. The display device of claim 5, wherein the light emitting diode light source is inserted to a light source hole defined through the diffusion member.

7. The display device of claim 1, wherein the lower substrate further comprises a diffusion particle disposed in the lower base substrate, and the lower base substrate has a refractive index which is different from a refractive index of the diffusion particle.

8. The display device of claim 1, wherein the light source driving electrode is one of a semi-transparent electrode and a transparent electrode.

9. The display device of claim 1, further comprising a light source line film comprising a base film and a first light source driving line disposed on the base film, wherein the first light source driving line connects a pad part disposed at an edge area of an upper surface of the lower base substrate to the light source driving electrode.

10. The display device of claim 9, further comprising:
    a printed circuit board;
    a driver disposed on the printed circuit board;
    a connection film connecting the printed circuit board to the edge area; and
    a second light source driving line connecting the pad part to the driver and comprising a first connector disposed on the connection film.

11. The display device of claim 10, wherein the second light source driving line further comprises a second connector which is disposed on the lower base substrate and comprises one end connected to the pad part and the other end connected to the first connector.

12. The display device of claim 11, wherein the second light source driving line further comprises a third connector which is disposed on the printed circuit board and comprises one end connected to the driver and the other end connected to the first connector.

13. The display device of claim 10, wherein the driver comprises a panel driver which controls the display panel and a light source driver which controls the light emitting diode light source, and the second light source driving line is connected to the light source driver.

14. The display device of claim 9, wherein the light source line film further comprises a first light source power line which is disposed on the base film and connects the pad part to the light source driving electrode.

15. The display device of claim 14, further comprising:
    a printed circuit board;
    a voltage supplier disposed on the printed circuit board;
    a connection film connecting the printed circuit board to the edge area; and
    a second light source power line connecting the pad part to the voltage supplier and comprising a connection part disposed in the connection film.

16. The display device of claim 14, wherein a film hole is defined through the lower base substrate, and the light source line film is connected to the pad part through the film hole.

17. A method of manufacturing a display device, the method comprising:
    providing a lower base substrate;
    disposing light emitting diode light sources on a lower surface of the lower base substrate;
    forming a pixel circuit layer on an upper surface of the lower base substrate; and
    forming a liquid crystal layer on the pixel circuit layer.

18. The method of claim 17, further comprising forming a light source driving electrode on the lower surface of the lower base substrate, wherein the light source driving electrode connects the light emitting diode light sources.

19. The method of claim 18, wherein the forming the light source driving electrode comprises:
    forming a conductive layer on the lower surface of the lower base substrate; and
    patterning the conductive layer to allow the light emitting diode light sources to be connected to one after another.

20. The method of claim 17, further comprising:
    forming an in-cell reflective polarizing plate on the upper surface of the lower base substrate;
    disposing an upper substrate on the liquid crystal layer; and
    disposing an upper polarizing plate on the upper substrate, wherein the in-cell reflective polarizing plate has a polarization axis which is substantially perpendicular to a polarization axis of the upper polarizing plate.

* * * * *